United States Patent
Warren et al.

(10) Patent No.: US 11,042,779 B2
(45) Date of Patent: Jun. 22, 2021

(54) AUTOMATIC GENERATION OF IMAGES SATISFYING SPECIFIED NEURAL NETWORK CLASSIFIER PROPERTIES

(71) Applicant: HRL Laboratories, LLC, Malibu, CA (US)

(72) Inventors: Michael A. Warren, Northridge, CA (US); Pape Sylla, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 108 days.

(21) Appl. No.: 16/563,172

(22) Filed: Sep. 6, 2019

(65) Prior Publication Data

US 2020/0143200 A1 May 7, 2020

Related U.S. Application Data

(60) Provisional application No. 62/754,344, filed on Nov. 1, 2018.

(51) Int. Cl.
*G06K 9/62* (2006.01)
*G06N 3/08* (2006.01)
*G06N 20/00* (2019.01)

(52) U.S. Cl.
CPC ......... *G06K 9/6256* (2013.01); *G06K 9/6264* (2013.01); *G06K 9/6267* (2013.01); *G06N 3/08* (2013.01); *G06N 20/00* (2019.01)

(58) Field of Classification Search
CPC .. G06K 9/6256; G06K 9/6264; G06K 9/6267; G06N 3/08; G06N 20/00
See application file for complete search history.

(56) References Cited

U.S. PATENT DOCUMENTS

| 10,789,288 | B1* | 9/2020 | Ranzinger | G06N 3/04 |
| 2019/0251721 | A1* | 8/2019 | Hua | G06N 3/08 |
| 2019/0391796 | A1* | 12/2019 | Brady | G06N 3/0454 |
| 2020/0082259 | A1* | 3/2020 | Gu | G06N 3/08 |

OTHER PUBLICATIONS

Chiw, Charisee. (2016). EIN: An intermediate representation for compiling tensor calculus. Proceedings of the 19th Workshop on Compilers for Parallel Computing (CPC 2019). (Year: 2019).*

(Continued)

*Primary Examiner* — Utpal D Shah
(74) *Attorney, Agent, or Firm* — Tope-McKay & Associates (57) ABSTRACT

Described is a system for automatically generating images that satisfy specific image properties. Using a code parser component, a tensor expression intermediate representation (IR) of a deep neural network code is produced. A specification describing a set of image properties is parsed in a fixed formal syntax. The tensor expression IR and the specification is input into a rewriting and analysis engine. The rewriting and analysis engine queries an external solver to obtain pixel values satisfying the specification. When pixel values satisfying the specification can be found in a fixed time period, the rewriting and analysis engine combines the pixel values into an image that satisfies the specification and outputs the image.

12 Claims, 5 Drawing Sheets

(56) References Cited

OTHER PUBLICATIONS

Yuan, Mingkuan & Peng, Yuxin. (2018). Text-to-image Synthesis via Symmetrical Distillation Networks. 1407-1415. 10.1145/3240508. 3240559. (Year: 2018).*

T. Xu et al., "AttnGAN: Fine-Grained Text to Image Generation with Attentional Generative Adversarial Networks," 2018 IEEE/CVF Conference on Computer Vision and Pattern Recognition, Salt Lake City, UT, 2018, pp. 1316-1324. (Year: 2018).*

Notification and International Preliminary Report on Patentability (Chapter II) for PCT/US2019/049989; dated Jun. 18, 2020.

Notification of Transmittal, the International Search Report, and the Written Opinion of the International Searching Authority for PCT/US2019/049989; dated Dec. 2, 2019.

Zhang Shengyu et al: "Text-to-Image Synthesis via Visual-Memory Creative Adversarial Network", Sep. 18, 2018 (Sep. 18, 2018), International Conference on Financial Cryptography and Data Security; [Lecture Notes in Computer Science; Lect.Notes Computer], Springer, Berlin, Heidelberg, pp. 417-427.

Hong Seunghoon et al: "Inferring Semantic Layout for Hierarchical Text-to-Image Synthesis", 2018 IEEE/CVF Conference on Computer Vision and Pattern Recognition, IEEE, Jun. 18, 2018 (Jun. 18, 2018), pp. 7986-7994.

Johnson Justin et al: "Image Generation from Scene Graphs", 2018 IEEE/CVF Conference on Computer Vision and Pattern Recognition, IEEE, Jun. 18, 2018 (2018-86-18), pp. 1219-1228.

Developers, Google. 2018. Protocol Buffers Version 3 Language Specification. Apr. 27. Accessed Apr. 12, 2019. https://developers.google.com/protocol-buffers/. pp. 1-8.

Gao, S., J. Avigad, and E. M. Clarke. 2012. "Delta-complete decision procedures for satisfiability over the reals." Logic in Computer Science (LICS). pp. 286-300.

Gao, S., S. Kong, and E. M. Clarke. 2013. "dReal: An SMT solver for nonlinear theories over the reals." CADE, pp. 1-6.

Goodfellow, I. J., J. Shlens, and C. Szegedy. 2015. "Explaining and harnessing adversarial examples." International Conference on Learning Representations (ICLR), pp. 1-11.

Katz, G., C. W. Barrett, D. L. Dill, K. Julian, and M. J. Kochenderfer. 2017. "Reluplex: An efficient SMT solver for verifying deep neural networks." Computer Aided Verification, CAV 2017. pp. 97-117.

Mooosavi-Dezfooli, S.-M., A. Fawzi, O. Fawzi, and P. Frossard. 2017. "Universal adversarial perturbations." IEEE CVPR. Honolulu, Hawaii, pp. 86-94.

Su, J., D. Vasconcellos Vargas, and S. Kouichi. 2017. One pixel attack for fooling deep neural networks. arXiv. pp. 1-15.

* cited by examiner

AUTOMATIC GENERATION OF IMAGES SATISFYING SPECIFIED NEURAL NETWORK CLASSIFIER PROPERTIES

CROSS-REFERENCE TO RELATED APPLICATIONS

The present application is a Non-Provisional Application of U.S. Provisional Application No. 62/754,344, filed in the United States on Nov. 1, 2018, entitled, "Automatic Generation of Images Satisfying Specified Neural Network Classifier Properties," the entirety of which is incorporated herein by reference.

BACKGROUND OF INVENTION

(1) Field of Invention

The present invention relates to a system for automatically generating images satisfying provided constraints and, more particularly, to a system for automatically generating images satisfying provided constraints based on code analysis and automatic solving techniques.

(2) Description of Related Art

Neural network based techniques are widely used in cutting-edge computer vision and other applications. One of the simplest forms of such a computer vision task is to classify images. That is, to assign to each input image i a label $c(i)$ from a fixed set of possible labels. For example, the Modified National Institute of Standards and Technology (MNIST) handwritten image data set consists of a total of 70,000 28×28 grayscale images of handwritten digits 0-9, and a classifier c returns an integer $0 \leq c(i) \leq 9$ for each image i. Note that it is the intention that the classifier should generalize to images outside of the actual target dataset, and so, in this case, should classify general 28×28 grayscale images. Neural network based image classifiers have a number of important practical applications ranging from identity verification to street sign recognition for self-driving cars.

By now it is well understood that neural network classifiers are often brittle in the sense that they misclassify images that human beings would easily classify correctly, even when these images are close (both in the informal and technical senses) to images in the datasets used to train the classifier. There is a wide range of recent work devoted to generating so-called adversarial examples of these kinds. See for instance, Literature Reference Nos. 4, 6, and 7 of the List of Incorporated Literature References. The techniques used to generate such examples themselves involve tools from the machine learning toolbox and typically start from existing known images and perform gradient following to the nearest decision boundary (the threshold in the space of all images beyond which the classification of images changes).

The principle disadvantages of this prior art are threefold. First, the prior art is focused on the restricted problem of producing examples of images that are misclassified by the neural network, but which no reasonable human observer would misclassify. Second, the prior art in most cases requires potentially large amounts of input data (images) in order to be able to function. Finally, the prior art is unable to target sophisticated logical properties of images (instead, it is focused more-or-less squarely on perturbing images). This final drawback of the state-of-the-art is partly related to the fact that these approaches rely on continuity and differentiability properties of functions that may fail to hold when considering arbitrary logical properties.

Thus, a continuing need exists for a method for automatically generating images satisfying provided constraints that does not require machine learning tools.

SUMMARY OF INVENTION

The present invention relates to a system for automatically generating images satisfying provided constraints and, more particularly, to a system for automatically generating images satisfying provided constraints based on code analysis and automatic solving techniques. The system comprises one or more processors and a non-transitory computer-readable medium having executable instructions encoded thereon such that when executed, the one or more processors perform multiple operations. The system uses a code parser component to produce a tensor expression in the tensor expression intermediate representation (IR) of a deep neural network code. A specification describing a set of image properties is parsed in a fixed formal syntax. The tensor expression IR and the specification are input into a rewriting and analysis engine. The rewriting and analysis engine queries an external solver to obtain pixel values satisfying the specification. When pixel values satisfying the specification can be found in a fixed time period, the rewriting and analysis engine combines the pixel values into an image that satisfies the specification and outputs the image.

In another aspect, the tensor expression IR is implemented as an inductive datatype, such that the tensor expression IR can be traversed recursively.

In another aspect, validation of the tensor expression IR is performed at runtime by the code parser and the rewriting and analysis engine.

In another aspect, the rewriting and analysis engine is configured to rewrite the tensor expression IR to a mathematically equivalent expression; generate a scalar expression from the tensor expression IRs; and query the external solver with scalar properties of the generated scalar expressions.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for automatically generating images satisfying provided constraints and, more particularly, to a system for automatically generating images satisfying provided constraints based on code analysis and automatic solving techniques. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Developers, Google. 2018. Protocol Buffers Version 3 Language Specification. April 27. Accessed Apr. 12, 2019. h t t p s : //developers.google.com/protocol-buffers/.

2. Gao, S., J. Avigad, and E. M. Clarke. 2012. "Delta-complete decision procedures for satisfiability over the reals." Logic in Computer Science (LICS). 286-300.

3. Gao, S., S. Kong, and E. M. Clarke. 2013. "dReal: An SMT solver for nonlinear theories over the reals." CADE.

4. Goodfellow, I. J., J. Shlens, and C. Szegedy. 2015. "Explaining and harnessing adversarial examples." International Conference on Learning Representations (ICLR).

5. Katz, G., C. W. Barrett, D. L. Dill, K. Julian, and M. J. Kochenderfer. 2017. "Reluplex: An efficient SMT solver for verifying deep neural networks." Computer Aided Verification, CAV 2017. 97-117.

6. Moosavi-Dezfooli, S.-M., A. Fawzi, O. Fawzi, and P. Frossard. 2017. "Universal adversarial perturbations." IEEE CVPR Honolulu, Hawaii. 84-94.

7. Su, J., D. Vasconcellos Vargas, and S. Kouichi. 2017. One pixel attack for fooling deep neural networks. arXiv.

(2) Principal Aspects

Various embodiments of the invention include three "principal" aspects. The first is a system for automatically generating images satisfying provided constraints. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
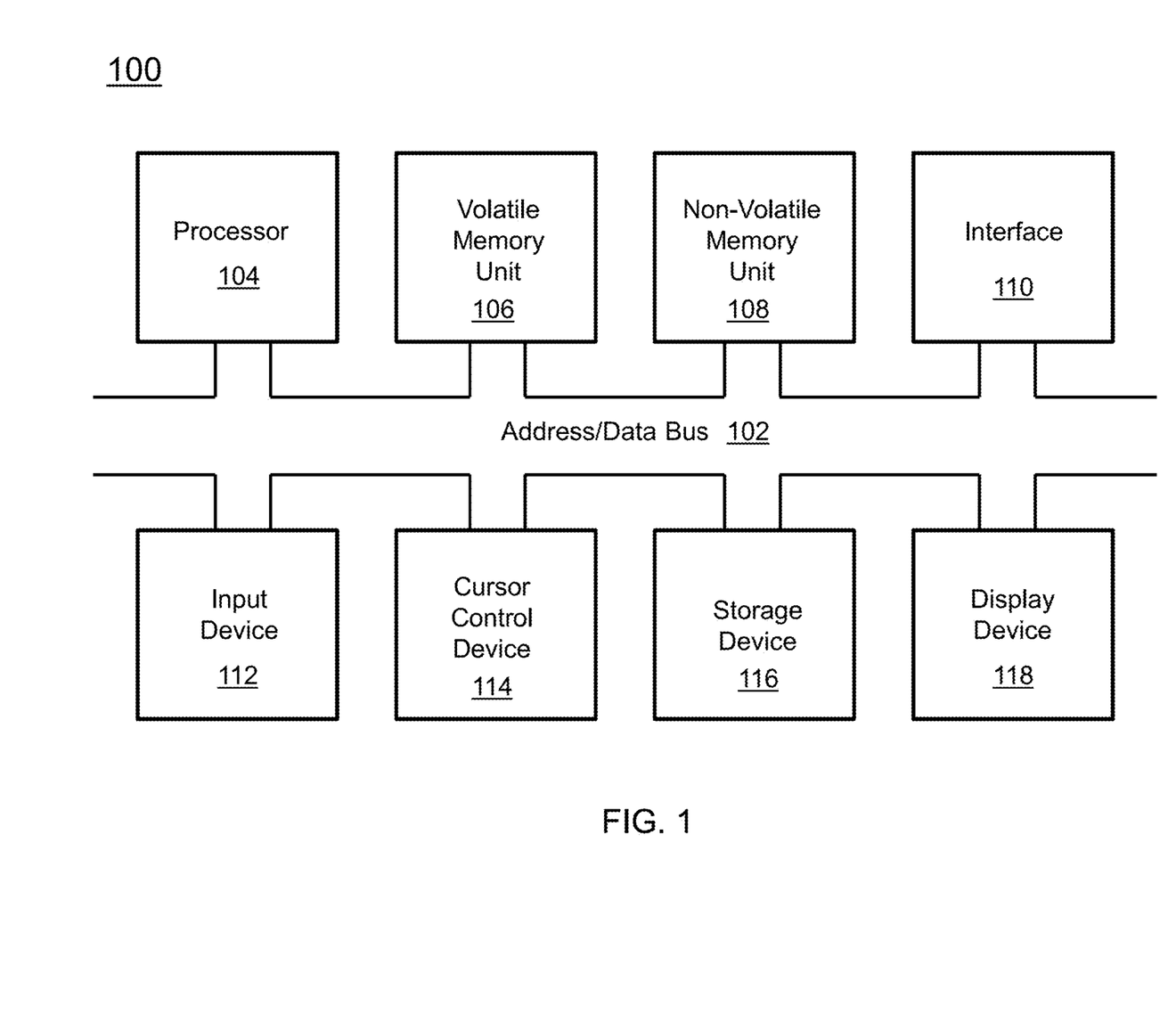
FIG. 1 is a block diagram depicting the components of a system for automatically generating images satisfying provided constraints according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
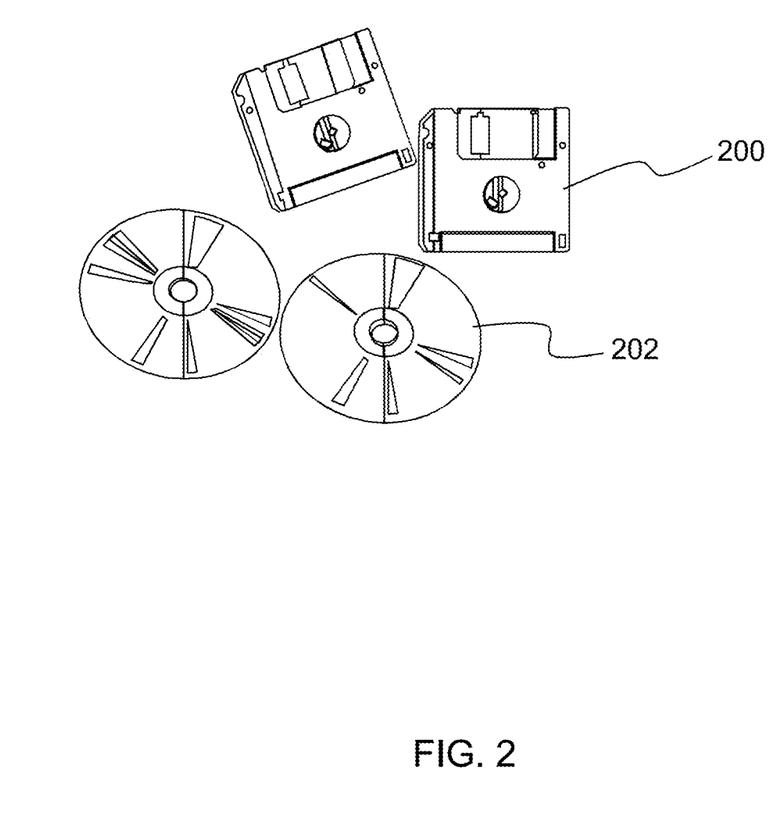
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a powerful and unique method for automatically generating images satisfying provided constraints based on code analysis and automatic solving techniques rather than machine learning tools. The kinds of images that can be generated include, but are not limited to, the traditional adversarial examples wherein a perturbation of a fixed image or set of images results in misclassification (see Literature Reference No. 4). Explicitly, the system according to embodiments of the present disclosure takes as inputs the following data: (1) the code of the neural network classifier c; (2) a specification describing, in a fixed formal syntax, the kind of image to be generated; and (3) optionally, a dataset of images.

The output of the system consists of either images that satisfy the specification or else a report that such images could not be found (within a fixed time-period). Here, the code should be in the form of either actual machine learning source code (e.g., TensorFlow source code) or a mathematical description of the neural network. The specification describes the properties that are desired of the generated image. For example, it could be requested that the generated image j should be close (in norm) to an existing image i, have a modified contrast, and receive a different classification from i (i.e., $X(i) \neq X(j)$). Alternatively, it could be requested that the generated image should be such that the classifier c has 50% confidence that i is a dog and 50% confidence that it is a chair (in such a case that "dog" and "chair" are valid labels for the classifier and where the classifier produces a probability distribution over labels as part of its algorithm).

Rather than randomly searching for examples, or relying on gradient traversal algorithms which have trouble with these kinds of specific image generation tasks, code analysis and Satisfiability Modulo Theories (SMT)—solving techniques are utilized to drive the search for images. While similar approaches have been used to find counter-examples to properties of cyber-physical systems, such as traditional software systems, medical devices or robots, it was previously not known that they could be used effectively to reason about neural network based computer vision algorithms. Critical to observations is the fact that neural network classifiers c can be understood as complicated real vector-valued non-linear functions.

Figure 3:
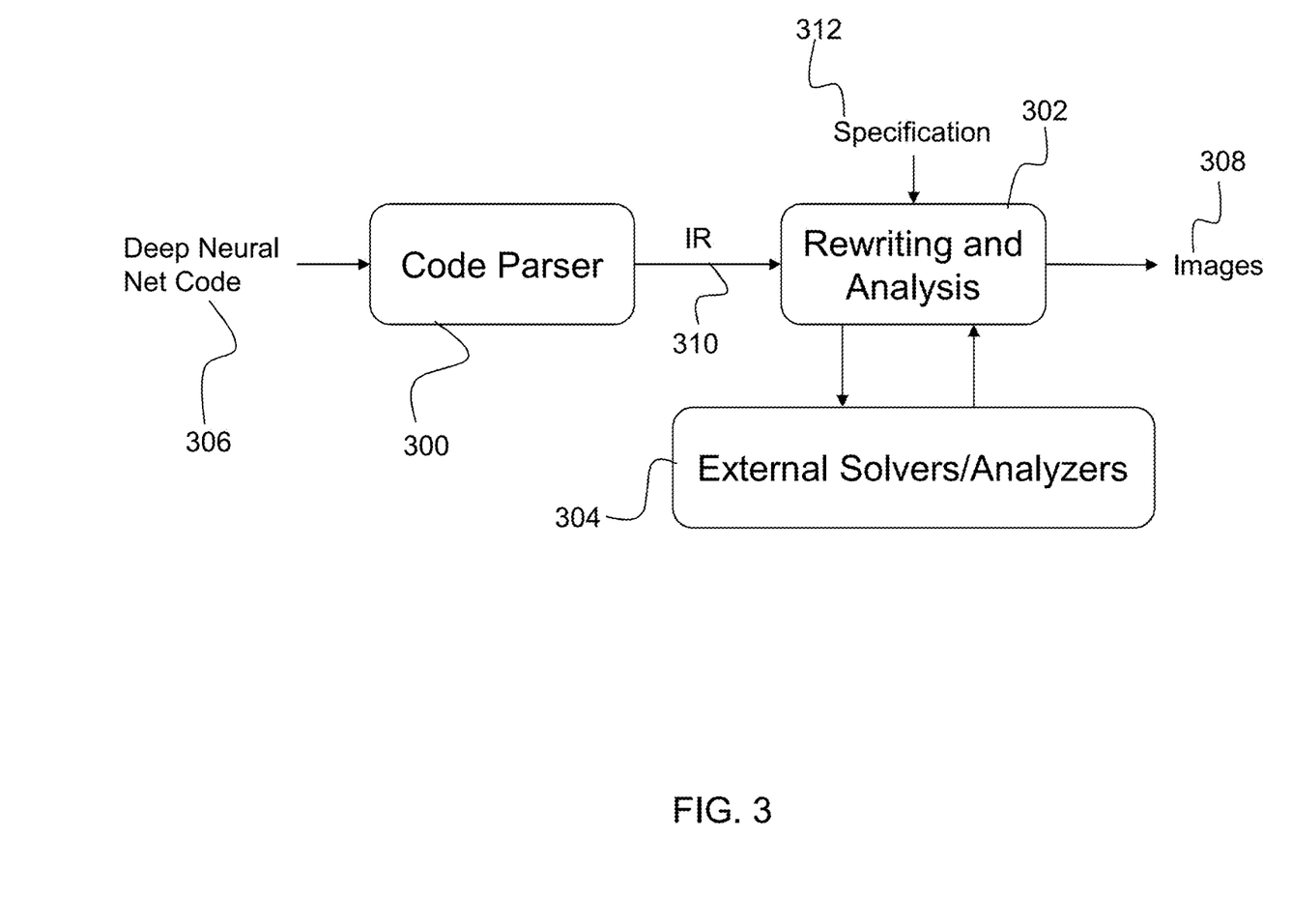
FIG. 3 is a flow diagram illustrating components of a system for automatically generating images satisfying provided constraints according to some embodiments of the present disclosure.

As shown in FIG. 3, the invention described herein consists of three main components, including a code parser 300, a rewriting and analysis engine 302, and a suite of external solvers/analyzers 304, such as Z3, Reluplex, dReal, or Yices. The entire process consumes deep neural network code 306 and produces images 308. The code parser 300 is the first software component which, given neural network code 306, produces an intermediate representation (IR) 310 in a specified IR format. The notion of performing analysis on an IR 310 is common in the domain of compilers and much of the approach according to embodiments of the present disclosure draws on an analogy with compilers, debuggers and other code analysis and manipulation tools from the traditional software world. Many of the external tools that are relied on are capable of reasoning about real numbers (scalars). However, the appropriate mathematical abstractions for reasoning about neural networks are not individual scalars, but tensors. The IR 310 developed for the invention described herein, which is referred to as the Tensor Expression IR 310, can be mathematically thought of as an abstraction of elements of the algebra $\oplus_{n,k} (\mathbb{R}^n)^{\oplus^k}$. In particular, the IR 310 is a grammar for specifying elements of this algebra. Crucially, variables ranging over such tensors are representable in the IR 310 and it is, therefore, possible to state and reason about logical properties of tensors.

In the current implementation, the Tensor Expression IR 310 is implemented as an inductive type (e.g., in the current C++ implementation this is accomplished using the visitor pattern (see Literature Reference No. 3) and in a functional programming language it could be implemented directly as an inductive type). This data structure is defined by rules for constructing tensor expressions as follows:

Variables x, y, z, . . . ranging over arbitrary tensors are tensor expressions. Variables have an associated shape, which captures the dimension data of the indeterminate tensors they represent.

Scalar multiplication: if e is a tensor expression and $\lambda$ is a scalar, then $\lambda$e is a tensor expression representing the result of performing scalar multiplication.

Matrix multiplication: ef is a tensor expression when e and f are tensor expressions.

Hadamard multiplication: e ⊙ f is a tensor expression when e and f are tensor expressions.

Addition: e+f is a tensor expression when e and f are tensor expressions.

Relu: ReLU(e) is a tensor expression when e is a tensor expression.

There are several things to note about this representation. First, the definition of the tensor expression IR 310 does not involve any validation on shape. Thus, e+f is defined even when e and f have different shapes, and matrix multiplication is defined even when the tensor expressions 310 involved do not represent matrices. Validation of tensor expressions 310 is performed at runtime by the code parser 300 and the rewriting and analysis engine 302 software. Second, that this structure should be implemented as an inductive datatype is crucial for efficiency since it means that, during rewriting and analysis, the structure can be traversed recursively. Finally, all of the clauses defining tensor expressions 310 are not exhaustively listed since these clauses correspond to those operations used typically to define neural networks, such as sigmoids, softmax, hyperbolic tangent, reshaping of tensors, convolutions, and pooling operations, which are familiar to anyone working with neural networks in practice. The datatype should be implemented in such a way that it is easily extensible to accommodate the addition of further neural network operations.

The code parser 300 consumes a serialized neural network 306 (in a designated format such as a TensorFlow graph saved as a protocol buffer (see Literature Reference No. 2). It traverses the serialized network and produces a corresponding tensor expression 310. Depending on the serialization protocol employed, the traversal can be implemented as a simple depth-first graph traversal (in the current implementation this is the approach taken for serialized TensorFlow models). As the structure is being traversed the corresponding tensor expressions 310 are recursively constructed (e.g., when the traversal encounters an addition operation in the serialized data structure, it constructs an addition tensor expression and recursively calls itself on the summands).

The rewriting and analysis engine 302 takes as inputs a specification 312 and a tensor expression 310. Specifications 312 $\varphi$ are defined to be logical formulae in the first-order language of real arithmetic with additional non-linear function symbols (corresponding to, e.g., sine, cosine, natural logarithm, exponential, etc.). The reader is referred to any textbook on logic or model theory for details regarding first-order logic. The variables of these formulae range over the pixels of the image to be produced. In many cases, the specification 312 also restricts the range of these variables, so that pixels must fall in a designated range, such as in the closed interval [−1,1]. Alternatively, in cases where a dataset of images is provided as input to the procedure, the pixels of a fixed image from the dataset might be used as the mean value in the range of the variables (i.e., for each pixel p of the fixed image from the dataset, it is possible to require that the variable corresponding to pixel p should be within a fixed ball of radius ∈>0 of p). In this case, images 308 that are generated would never be too far from the fixed image. There are no further restrictions on the formulae, although typical specifications do not involve quantifiers. Indeed, formulae with alternating quantifiers are computationally more challenging to reason about as is well-known.

The rewriting and analysis engine 302 performs the following tasks:
1. Depending on the specification 312 $\varphi$ of the images 308 to be generated, it rewrites tensor expressions 310 to mathematically equivalent expressions.
2. When possible, analysis of the tensor expression 310 itself is performed.
3. The engine 302 generates scalar expressions from tensor expressions 310 and queries external solvers/analyzers 304 with scalar properties of the generated expressions.

For (1), certain globally valid rewrites can be applied to simply expressions and to put them in a suitable normal form. Non-limiting examples of the basic kinds of rewrites that may be applied include:

Rewriting of iterated ReLU non-linear activation units: ReLU(ReLU(X)) ⟿ ReLU(X).

Rewriting scalar multiplication by zero: 0X ⟿ 0.

Rewriting scalar multiplication by one: 1X ⟿ X.

Rewriting iterated additions to favor association to the left: X+(Y+Z) ⟿ (X+Y)+Z.

When the specification 312 has constrained the variable X so that all of its entries are non-negative, directly rewrite ReLUs: ReLU(X) ⟿ X.

As with the definition of tensor expressions, the rewrites employed are extensible, but care should be taken in the implementation to only carry out rewrites that are valid in the sense of preserving the meanings of the expressions in all cases. For instance, the last example given cannot be utilized unless X is non-negative lest the results are no longer accurate. Rewriting can be carried out using any of the common algorithms (see Literature Reference No. 1).

For (2), when it is possible to analyze the validity of the specification 312 directly from the tensor expression 310, this should be done. The current implementation uses an ad hoc procedure for doing so and only avoids unnecessary search when a property is already clearly unsatisfiable. One would eventually use SMT solving techniques directly at the level of tensor expression IRs 310 in order to rule out unsatisfiable cases.

For (3), it is necessary to develop a library that converts tensor expressions 310 into expressions of the external solvers/analyzers 304. In the case of SMT solvers that operate on the level of real number expressions, one typically is converting tensor expressions 310 into scalar-valued expressions by:

Accessing a cell in the tensor. This is generally the output layer of the classifier c, and scalar expressions are obtained by accessing $c[i]$ for i an index. Similarly, when the tensor represents an image, pixels and their channels can be accessed in this way.

Taking an inner product of vectors or applying a norm. These are often used to constrain the distances of output images from specified reference images.

In the current implementation, the specification 312 φ itself being a formula of first-order real arithmetic with non-linear function symbols makes direct reference to these scalar-values produced from the corresponding tensor expressions 310. Finally, the external solving tools 304 can be called to solve for the variable (pixel) values. In the current implementation, the process of calling an external solver/tool 304 is mediated by three components. The first is a C++ template library for manipulating tensors defined over a variable type T. The manipulations being considered here are the actual operations (such as calculating the value of a matrix multiplication or reshaping a tensor). The rationale behind implementing this as a template library is to carry out the same operations for a variety of datatypes ranging from ordinary double values (for testing purposes this is useful) to types used to form expressions in the external tools.

The second component is an "adapter" that coverts a tensor expression 310 into a tensor over a designated T. In the current implementation, there are adapters for double and for the dReal 4 solver. Finally, there is a library of common scalar-valued functions (e.g., norms) from tensors over T to T In the implementation these again target double and the Expression type from dReal 4. One crucial point regarding use of external SMT solvers is that because the system deals with non-linear functions, the solvers called should be capable of efficiently handling the functions used. For sigmoid, softmax, etc., dReal 4 is the most reasonable option, as its underlying algorithms are designed for reasoning about non-linear functions such as these.

Finally, when the rewriting and analysis engine 302 has successfully queried the solver 304 to obtain pixel values satisfying the specification 312, it combines these into an image 308, which it then returns. If it cannot find values for all of the pixels before a fixed timeout, then it reports that it was unable to produce the requested image. In the latter case, there is no guarantee that no such image exists. Note that the problem of finding an image 308 of fixed-size satisfying a given logical property is NP-complete, as a general solution to this problem can be used to solve the 3-SAT problem. As such, assuming P is not equal to NP, there are many cases where an image satisfying the property exists but cannot be found in a reasonable amount of time.

Figure 4A:
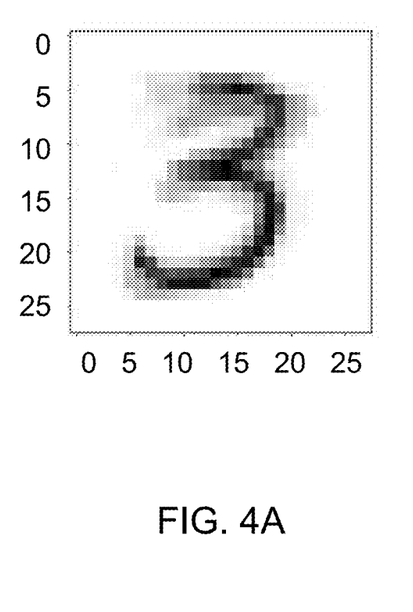
FIG. 4A illustrates a correctly classified "three" according to some embodiments of the present disclosure.
Figure 4B:
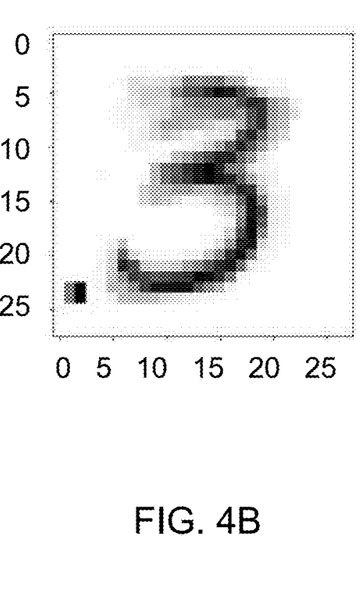
FIG. 4B illustrates a misclassified "three" according to some embodiments of the present disclosure.
Figure 4C:
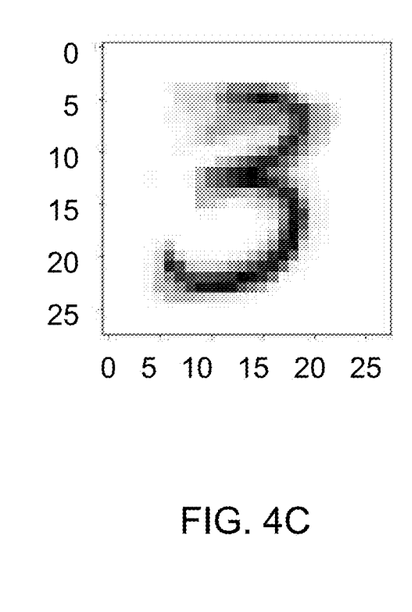
FIG. 4C illustrates another misclassified "three" according to some embodiments of the present disclosure.
Figure 5:
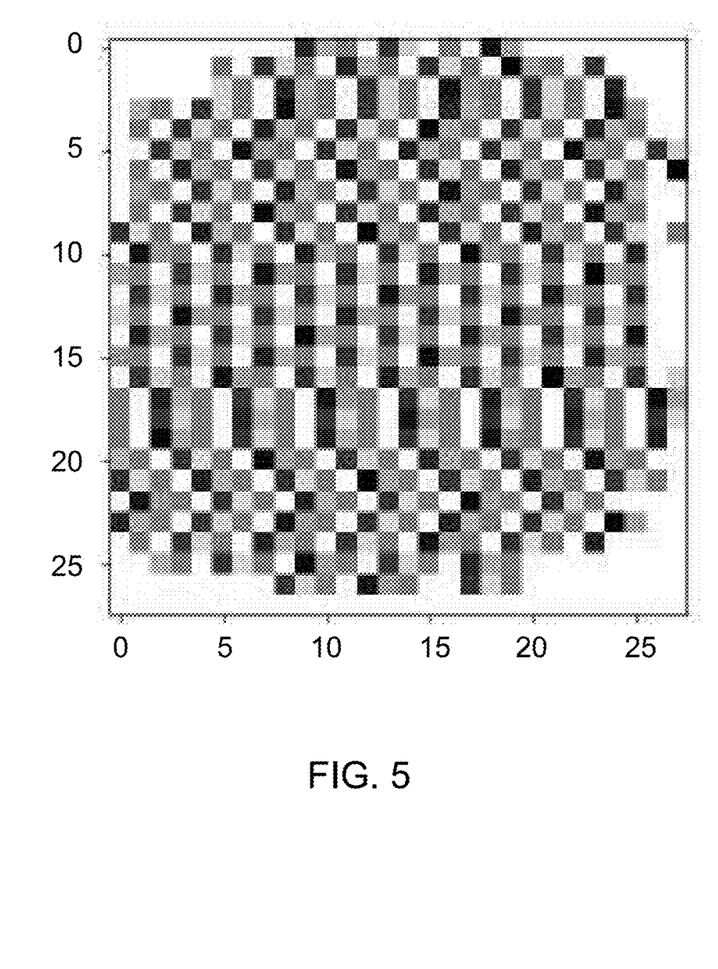
FIG. 5 illustrates an image produced with the property of being classified by the network as a zero with high probability according to some embodiments of the present disclosure.

A deep neural network code 306 was used in experimental studies. The invention described herein has been successfully tested and used to generate images 308 that are misclassified by the neural networks on which it was tested. FIG. 4A depicts a correctly classified three. FIGS. 4B and 4C depict two misclassified threes discovered by the invention described herein having at most four pixels different (the specification) from the correctly classified image. FIGS. 4B and 4C illustrate the use case of finding misclassified images that are sufficiently similar to correctly classified images that a human would not be mistaken. As another example, FIG. 5 shows the result of a targeted request where no input images were provided to the algorithm. In this case, the generated image was classified as being a zero with probability over a fixed threshold (in this case 90%).

In contrast to existing technologies that all utilize machine learning techniques, the techniques relied on in the system and method according to embodiments of the present disclosure arise in the area of formal methods. Additionally, existing work in formal methods largely relies on decision procedures (quantifier elimination) for real arithmetic without non-linear functions. The latter theory is undecidable, but non-linear solving techniques, such as those in Literature Reference Nos. 4 and 5, can be used to generate candidate images 308 satisfying the specified properties. These techniques have previously not been applied to computer vision problems.

Unlike the numerical approaches employed in machine learning attempts to generate images satisfying certain constraints, the invention described herein is able to target highly detailed specifications for generation of images. Moreover, because it is based on a mathematical analysis of both the logical structure of the specifications and the structure of the neural network itself, it can in many cases find (generate) images satisfying the specifications (e.g., an image that would be misclassified by the deep neural net code) much more quickly. Finally, because gradient following techniques are not relied on, as in the state-of-the-art approaches, there are no differentiability or continuity considerations that limit the range of constraints that the system can handle. The capability to provide general specifications of image properties that detail how the image should interact with the classifier is a unique capability provided by this invention.

Vehicle (e.g., airplanes, cars, autonomous vehicles, helicopters, unmanned aerial vehicles (UAVs)) manufacturers are exploring the use of neural network based machine learning algorithms for computer vision. The most natural application is in the domain of autonomous cars, where the perception algorithms involve visual input. In the case of flight vehicles, applications include automatic target recognition, surveillance, reconnaissance, automated mid-air refueling, and autonomous taxi.

In addition, there are a variety of computer vision/object recognition applications that enable automatic manufacturing or inspection. The benefit is that the invention described herein can be used to identify instances in which computer vision code fails to behave correctly. These instances could then be used to train the classifiers to improve performance or to suggest other modifications of the neural network architecture that would improve its robustness. It can also be used on commercial off-the-shelf (COTS) or other vendor neural network code that can be deployed in order to evaluate the resilience of that code.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for automatically generating images, the system comprising:
one or more processors and a non-transitory memory having instructions encoded thereon such that when the instructions are executed, the one or more processors perform operations of:
producing, with a code parsing component, a tensor expression in the tensor expression intermediate representation (IR) of a deep neural network code;
parsing a specification describing a set of image properties in a fixed formal syntax;
inputting the tensor expression IR and the specification into a rewriting and analysis engine;
querying, by the rewriting and analysis engine, an external solver to obtain pixel values satisfying the specification; and
when pixel values satisfying the specification can be found in a fixed time period, combining, by the rewriting and analysis engine, the pixel values into an image that satisfies the specification and outputting the image.

2. The system as set forth in claim 1, wherein the tensor expression IR is implemented as an inductive datatype, such that the tensor expression IR can be traversed recursively.

3. The system as set forth in claim 1, wherein validation of the tensor expression IR is performed at runtime by the code parsing component and the rewriting and analysis engine.

4. The system as set forth in claim 1, wherein the rewriting and analysis engine is configured to perform operations of:
rewriting the tensor expression IR to a mathematically equivalent expression;
generating a scalar expression from the tensor expression IRs; and
querying the external solver with scalar properties of the generated scalar expressions.

5. A computer implemented method for automatically generating images, the method comprising acts of:
causing one or more processors to execute instructions encoded on a non-transitory computer-readable medium, such that upon execution, the one or more processors perform operations of:
producing, with a code parsing component, a tensor expression in the tensor expression intermediate representation (IR) of a deep neural network code;
parsing a specification describing a set of image properties in a fixed formal syntax;
inputting the tensor expression IR and the specification into a rewriting and analysis engine;
querying, by the rewriting and analysis engine, an external solver to obtain pixel values satisfying the specification; and
when pixel values satisfying the specification can be found in a fixed time period, combining, by the rewriting and analysis engine, the pixel values into an image that satisfies the specification and outputting the image.

6. The method as set forth in claim 5, wherein the tensor expression IR is implemented as an inductive datatype, such that the tensor expression IR can be traversed recursively.

7. The method as set forth in claim 5, wherein validation of the tensor expression IR is performed at runtime by the code parsing component and the rewriting and analysis engine.

8. The method as set forth in claim 5, wherein the method further comprises acts of:
rewriting, with the rewriting and analysis engine, the tensor expression IR to a mathematically equivalent expression;
generating, with the rewriting and analysis engine, a scalar expression from the tensor expression IRs; and
querying, with the rewriting and analysis engine, the external solver with scalar properties of the generated scalar expressions.

9. A computer program product for automatically generating images, the computer program product comprising:
computer-readable instructions stored on a non-transitory computer-readable medium that are executable by a computer having one or more processors for causing the processor to perform operations of:
producing, with a code parsing component, a tensor expression in the tensor expression intermediate representation (IR) of a deep neural network code;
parsing a specification describing a set of image properties in a fixed formal syntax;
inputting the tensor expression IR and the specification into a rewriting and analysis engine;
querying, by the rewriting and analysis engine, an external solver to obtain pixel values satisfying the specification; and
when pixel values satisfying the specification can be found in a fixed time period, combining, by the rewriting and analysis engine, the pixel values into an image that satisfies the specification and outputting the image.

10. The computer program product as set forth in claim 9, wherein the tensor expression IR is implemented as an inductive datatype, such that the tensor expression IR can be traversed recursively.

11. The computer program product as set forth in claim 9, wherein validation of the tensor expression IR is performed at runtime by the code parsing component and the rewriting and analysis engine.

12. The computer program product as set forth in claim 9, further comprising instructions for:
- rewriting, with the rewriting and analysis engine, the tensor expression IR to a mathematically equivalent expression;
- generating, with the rewriting and analysis engine, a scalar expression from the tensor expression IRs; and
- querying, with the rewriting and analysis engine, the external solver with scalar properties of the generated scalar expressions.

\* \* \* \* \*